United States Patent

Freeman

[15] 3,670,754
[45] June 20, 1972

[54] VACUUM CONTROLLED FLUIDIC REGULATOR

[72] Inventor: Peter A. Freeman, 8807 Littlewood Road, Baltimore, Md. 21234

[22] Filed: Sept. 29, 1970

[21] Appl. No.: 76,414

[52] U.S. Cl. ............................................. 137/81.5
[51] Int. Cl. .................................................F15c 1/04
[58] Field of Search ...............................................137/81.5

[56] References Cited

UNITED STATES PATENTS

| | | | |
|---|---|---|---|
| 3,331,380 | 7/1967 | Schonfeld et al. | 137/81.5 |
| 3,444,879 | 5/1969 | McLeod, Jr. | 137/81.5 |
| 3,448,752 | 6/1969 | O'Neill | 137/815 |
| 3,566,897 | 3/1971 | Collier | 137/81.5 |
| 3,578,010 | 5/1971 | Campagnuolo | 137/81.5 |
| 3,584,635 | 6/1971 | Warren | 137/81.5 |
| 3,587,605 | 6/1971 | Verplank | 137/81.5 |

*Primary Examiner*—Samuel Scott
*Attorney*—Ernest S. Cohen and Albert A. Kashinski

[57] ABSTRACT

Flow diversion in a fluidic regulator is controlled without moving parts. Depending upon the fluid level in a first channel, a vacuum operated system diverts a portion of incoming flow into a second channel. The operating vacuum is generated within the regulator, itself, so that regulator operation is self-contained.

9 Claims, 2 Drawing Figures

PATENTED JUN 20 1972    3,670,754

INVENTOR
PETER A. FREEMAN

BY Ernest S. Cohen
   Albert A. Fachinah
                ATTORNEYS

3,670,754

VACUUM CONTROLLED FLUIDIC REGULATOR

BACKGROUND OF THE INVENTION

Fluidic regulators are devices for distributing fluid flow between two or more outputs. Because of their simple design and operation, these regulators have won increasing popularity for fluid control in diverse environments. At the heart of the regulator is a fluidic element which selectively diverts a fluid stream into one of several outputs, and does so without moving parts. Despite the simplicity of the fluidic element, the overall simplification of fluidic regulators in the prior art has been impeded by the use of moving parts in the regulator control system. Although operation of the fluidic element was relatively trouble free, the moving parts of the control system required periodic inspection and maintenance. To overcome this difficulty of the prior art this invention was made.

SUMMARY OF THE INVENTION

This invention is a vacuum controlled fluidic regulator. A flowing fluid enters the regulator through an inlet channel, passes through a venturi, and is discharged through two outlet channels. Depending upon the flow level detected by a sensor in one outlet channel, the flowing fluid is divided in varying proportions between both outlet channels. Diversion of the flowing fluid into one or the other channel is regulated by controlling aspiration of a control fluid through two control ports on opposite sides of the venturi. When aspiration on one side of the venturi is relatively higher than one the other side, the fluid tends to flow toward the side of lesser aspiration, where pressure is lowest. By automatically varying the relative aspiration through the two control ports in response to flow conditions in one outlet channel, the fluid is divided between the two outlet channels.

Aspiration of the control fluid through the control ports in the venturi is controlled by a vacuum system that operates without moving parts. Vacuum for the system is generated by the fluid flowing through the venturi. Each control port in the venturi is connected by a conduit to a separate sensor with an opening for admitting the control fluid under influence of the vacuum. In the preferred embodiment, air is used as the control fluid. One sensor is positioned in an outlet channel where the level of fluid flowing in the channel determines the amount of air aspirated through the opening in the sensor, and also through its associated control port. A second sensor is suspended within a vented container, or other chamber, containing a liquid bath. Again, the level of the fluid bath determines the amount of air aspirated through the second sensor. By interconnection with the first sensor, the level of the fluid bath varies inversely to the level of the fluid flowing in the outlet channel. In this way, a change in aspiration through the first control port causes an inverse change in aspiration through the second control port. Because it has no moving parts, the aspiration control system functions with minimum maintenance in caustic environments such as sewage distribution systems and chemical processing equipment.

Therefore, one object of this invention is a fluidic regulator without moving parts.

Another object of this invention is a vacuum controlled fluidic regulator.

These and other objects of the invention are apparent in the following specification and drawing.

DESCRIPTION OF THE PREFERRED EMBODIMENT

Figure 1:
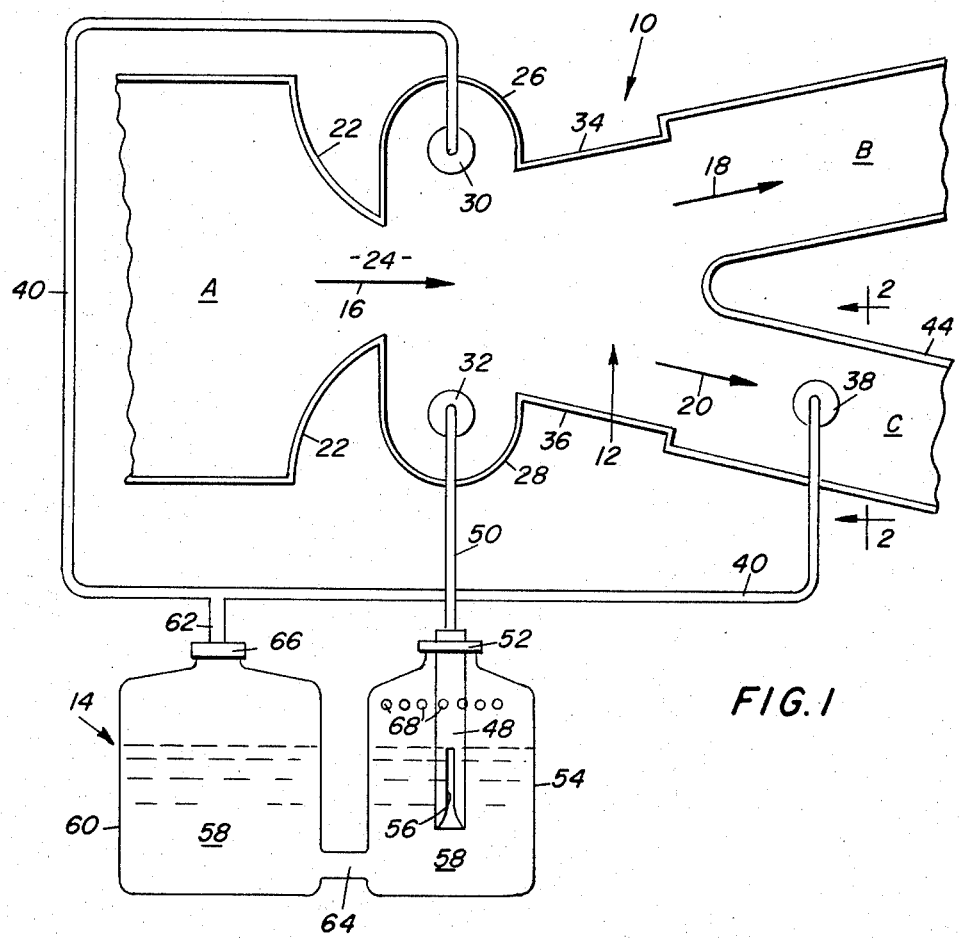
FIG. 1 shows a fluidic regulator 10, including a plan view of a fluidic element 12 and an interconnected side view of aspiration control chambers 54 and 60.

A fluidic regulator 10 is shown in FIG. 1. Basically, the regulator consists of a fluidic element 12 and an aspiration control system 14. Through interaction between the fluidic element, the aspiration control system, and a flowing fluid, the fluid path, under appropriate conditions, is switched by the regulator from one output channel to another.

Fluidic element 12 has an inlet channel A, and two outlet channels B and C. Each channel has a trough-like cross-section, as shown for channel C in FIG. 2. Fluid entering the element at channel A in the direction of arrow 16 is diverted into either channel B in the direction of arrow 18 or channel C in the direction of arrow 20, or alternatively divided between both channels. Diversion of the fluid in either direction is controlled by regulating pressure conditions within the fluidic element.

As it enters the fluidic element 12 in the direction of arrow 16, a flowing fluid encounters the convex walls 22 of a venturi nozzle 24. The constricted nozzle increases the fluid flow rate, reducing fluid pressure in the area of two control pockets 26 and 28, and causing a partial vacuum within the element. Within each control pocket a control port 30 and 32 is connected to an outside source of control fluid. Each control port is an opening for passage of the control fluid into the flowing fluid stream as the stream passes through the venturi. When both control ports are in a similar open or closed state, balanced pressure directs the flowing fluid equally into channels B and C. When one control port is open and the other closed, unbalanced pressure, caused by aspiration of the control fluid through the open control port, diverts the fluid away from the balanced path. By closing control port 30 and opening port 32 aspiration is caused through port 32, and the flowing fluid attaches to side wall 34 of element, flowing into channel B. Opening port 30 and closing port 32 reverses the internal pressure, attaching the flowing fluid to side wall 36 and directing it into channel C. Between these extremes, gradual differential pressure variations enable diversion of any selected portion of fluid into either channel B or C, as is well known in the fluidic art.

For controlling the relative amounts of fluid flow within channels B or C of fluidic element 12, this invention employs a novel aspiration control system 14 with the advantage of operating without moving parts. In the preferred configuration shown in FIG. 1, the fluidic regulator 10 is rigged to normally direct flow from channel A into channel C. When the depth of fluid in channel C exceeds a design limit, the control system 14 automatically shifts a portion of the flow into channel B.

Figure 2:
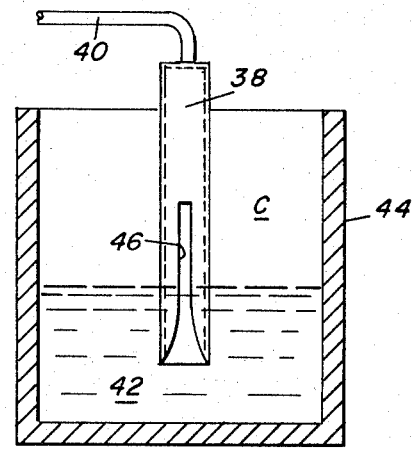
FIG. 2 is a sectional view taken along lines 2—2 of FIG. 1.

In the explanation that follows, water is described as the fluid flowing through the fludic element, and air as the control fluid aspirated through control ports 30 and 32, although other fluids are equally suitable. As seen in FIG. 1, air is fed to control port 30 through a dip-tube sensor 38 and an interconnecting conduit 40. The sensor 38 is suspended by a suitable support (not shown) within channel C in the path of flowing water 42, as shown in FIG. 2. The sensor is located relative to the channel side walls 44 in a position suitable to prevent fouling by any debris floating in the water. In the preferred embodiment, sensor 38 is a hollow tube, closed at the end where it intersects conduit 40, and open at the opposite end. On the downstream side of the sensor, a tapered lengthwise slot 46 extends from the center to the open end. Depending upon the depth of water within channel C, the slot is either completely open, or from partially to completely submerged. When the water level is low, air is aspirated through the open slot 46 and control port 30, preventing fluid flowing through channel A from attaching to side wall 34. When the water level is high, aspiration through the slot is prevented, and flow is directed into channel B.

A second dip-tube sensor 48 controls aspiration through control port 32. Sensor 48 is similar in design to sensor 38, and is connected to the control port through a hollow conduit 50. As seen in FIg. 1, sensor 48 is suspended by a flange 52 within a hollow chamber, shown as a container 54. Under low water flow levels in channel C, the slot 46 of sensor 48 is completely submerged in a liquid bath 58 within container 54. The liquid bath prevents aspiration through sensor 48 and control port 32, causing the flowing water to attach itself to side wall 36 and to enter channel C.

When water flow through channel C increases, the water level in the channel rises, reducing the open area of slot 46. As the open area is reduced, aspiration through control port 30 diminishes, diverting some water flow into channel B. Ultimately, when slot 46 is completely submerged, aspiration through port 30 is prevented and the flowing water attaches to side wall 34. Although aspiration has ceased, the flow of water through venturi 24 continues to draw a vacuum within conduit 40. This vacuum is used to activate aspiration through control port 32, resulting in diversion of flow away from channel C.

For controlling aspiration through control port 32, a second hollow chamber, shown as a container 60, is connected to conduit 40 by a conduit 62. Through a common fluid connection 64, container 60 is also joined to the base of container 54 so that the liquid bath 58 flows freely between them. A cap 66 seals the neck of container 60 and conduit 62 with a vacuum-tight fit, drawing the vacuum in conduit 40 also within container 60. Vent holes 68 adjacent to the neck of container 54 place its interior at atmospheric pressure. The resulting pressure differential within the sealed and vented containers forces the fluid bath 58 downward in container 54, through the fluid connection 64, and into container 60. As the amount of fluid in container 54 decreases, a level is reached at which slot 56 opens to the atmosphere through vent holes 68. At this level aspiration through control port 32 begins, decreasing water flow into channel C. Then, as flow through channel C decreases, the process reverses, diverting flow from channel B back into channel C, the process repeating until a steady state is reached.

Between extreme flow conditions when sensors 38 and 40 are completely open or closed, intermediate flow conditions are graduated by the slot dimensions of sensors 38 and 48, by the relative sizes and shapes of containers 54 and 60, and by the vacuum intensity generated by flow through venturi 24. As seen in FIG. 2, an irregularly shaped slot in sensor 38 controls aspiration by varying the vacuum drawn in container 60 in a non-linear manner. Similarly, aspiration through sensor 48 is controlled by an irregularly shaped slot in sensor 48. By varying the position and dimension of these slots, a precise degree of flow control through channels B and C is possible. Similarly, by varying the relative shapes and sizes of containers 54 and 60, additional control is possible. Since operation of both the sensors and containers is dependent upon the vacuum induced by venturi 24, a further degree of control is available through design variation of the venturi. Modification of each of these features to suit a specific fluid environment is expected, and will easily be performed by skilled workers in the fluidic art.

One specific application for which this invention is well suited is fluid diversion in sewage systems. With channel A as the input, channel B operating as a combined sewer discharge, and channel C operating as an interceptor sewer discharge, automatic sewage diversion into the combined discharge takes place whenever the interceptor approaches an overload. When flow volume through the interceptor decreases, the combined discharge is automatically turned off. The entire operation is accomplished without moving parts, avoiding the operational difficulties inherent in mechanisms operated in caustic sewage environments.

While this invention, for convenience, has been disclosed with reference to a specific preferred embodiment, numerous modifications within the scope of the invention are expected. For this reason, the invention should be limited only by the scope of the following claims.

I claim:
1. A fluidic regulator comprising:
a fluidic element including an inlet channel, a venturi nozzle, and first and second outlet channels,
vacuum operated aspiration control means responsive to flow conditions within the first outlet channel for regulating the amount of flow diverted to the second outlet channel,
the vacuum operated aspiration control means including a first sensor within one outlet channel of the fluidic element, and a second sensor within a chamber containing a fluid bath,
means interconnecting the first sensor and the chamber for affecting flow conditions within the second outlet channel and for affecting the level of the fluid bath in response to changing flow conditions within the first outlet channel, and
the second sensor responding to changes in the level of the fluid bath by regulating flow conditions within the first outlet channel.
2. A fluidic regulator as claimed in claim 1 in which:
the first and second sensors comprise enclosures with openings for admitting selected amounts of a control fluid, the amount of control fluid admitted through the openings being regulated by immersion of each opening into other fluids.
3. A fluidic regulator as claimed in claim 2 in which:
the openings in the first and second sensors are so shaped and positioned within the other fluids to vary the relative amounts of control fluid admitted into the enclosures, depending upon the depth of immersion of the sensors into the other fluids.
4. A fluidic regulator as claimed in claim 2 in which:
the control fluid is air, the other fluid for the first sensor is sewage and the other fluid for the second sensor is a liquid.
5. A fluidic regulator comprising:
a fluidic element and an aspiration control system;
the fluidic element further comprising:
an inlet channel,
a venturi nozzle intersecting the inlet channel at one end, and having a longitudinal axis,
first and second outlet channels intersecting the other end of the venturi nozzle, and diverging in opposite directions from the longitudinal axis,
first and second control ports on opposite sides of the venturi nozzle, spaced from one another in the direction of divergence of the outlet channels, the first control port being on the same side of the longitudinal axis as the first outlet channel, and the second control port being on the same side of the longitudinal axis as the second outlet channel;
the aspiration control system further comprising:
first sensor means within the first outlet channel, connected with the second control port by a first conduit for controlling aspiration through the second control port,
a vented chamber,
second sensor means substantially within the vented chamber, connected with the first control port by a second conduit for controlling aspiration through the first control port,
a sealed chamber connected with the first conduit, and, by a common fluid connection, with the vented chamber,
a fluid bath in both the vented and sealed chambers, free to flow between the chambers through the common fluid connection,
the first sensor means being so positioned within the first outlet channel that changes in flow conditions within the channel affect aspiration through the second control port, and affect a vacuum drawn in the first conduit and sealed chamber,
the second sensor means being so positioned within the vented chamber that changes in the level of the fluid bath affect aspiration through the first control port,
whereby flow conditions within the first channel regulate flow conditions within the second channel, and through level changes of the fluid bath, caused by the vacuum within the sealed chamber, also regulate flow conditions within the first channel.
6. A fluidic regulator as claimed in claim 5 in which:

the first and second sensors comprise enclosures with openings for admitting selected amounts of control fluid, the amount of control fluid admitted through the opening in the first sensor being regulated by the depth of fluid in the first output channel, and the amount of fluid admitted through the opening in the second sensor being regulated by the level of the fluid bath.

7. A fluidic regulator as claimed in claim 6 in which:
the control fluid is air,
the fluid in the first output channel is sewage, and
the fluid bath is a liquid.

8. A fluidic regulator as claimed in claim 6 in which:
the openings in the first and second sensors are shaped and positioned within the first outlet channel and vented chamber to vary the relative amount of control fluid admitted into the enclosures, depending upon the depth of immersion of the sensors in the fluid flowing through the first outlet channel and in the fluid bath.

9. A fluidic regulator as claimed in claim 8 in which:
the control fluid is air,
the fluid in the first output channel is sewage, and
the fluid bath is a liquid.

* * * * *

UNITED STATES PATENT OFFICE
CERTIFICATE OF CORRECTION

Patent No. 3,670,754  Dated June 20, 1972

Inventor(s) Peter A. Freeman

It is certified that error appears in the above-identified patent and that said Letters Patent are hereby corrected as shown below:

On the cover sheet insert:

-- [73] Assignee The United States of America as Represented by the Secretary of the Interior-- and on the same page

Before the Abstract insert--

-- This invention was made pursuant to Contract No. 14-12-486 with the U.S. Department of the Interior, Federal Water Quality Administration--

Signed and sealed this 20th day of November 1973.

(SEAL)
Attest:

EDWARD M. FLETCHER, JR.  RENE D. TEGTMEYER
Attesting Officer  Acting Commissioner of Patents

FORM PO-1050 (10-69)

USCOMM-DC 60376-P69
☆ U.S. GOVERNMENT PRINTING OFFICE : 1969 O—366-334.